(12) United States Patent
Yoshida

(10) Patent No.: US 10,326,393 B2
(45) Date of Patent: Jun. 18, 2019

(54) VARIABLE-SPEED PUMPED STORAGE POWER GENERATION APPARATUS

(71) Applicant: HITACHI MITSUBISHI HYDRO CORPORATION, Tokyo (JP)

(72) Inventor: Masahiro Yoshida, Tokyo (JP)

(73) Assignee: HITACHI MITSUBISHI HYDRO CORPORATION, Tokyo (JP)

( * ) Notice: Subject to any disclaimer, the term of this patent is extended or adjusted under 35 U.S.C. 154(b) by 0 days.

(21) Appl. No.: 16/064,443

(22) PCT Filed: Dec. 24, 2015

(86) PCT No.: PCT/JP2015/086131
§ 371 (c)(1),
(2) Date: Jun. 20, 2018

(87) PCT Pub. No.: WO2017/109921
PCT Pub. Date: Jun. 29, 2017

(65) Prior Publication Data
US 2018/0375452 A1    Dec. 27, 2018

(51) Int. Cl.
*H02P 9/00* (2006.01)
*H02P 9/04* (2006.01)
(Continued)

(52) U.S. Cl.
CPC .............. *H02P 9/04* (2013.01); *F03B 15/04* (2013.01); *H02P 9/00* (2013.01); *H02P 23/00* (2013.01);
(Continued)

(58) Field of Classification Search
CPC ........................................................ H02P 9/04
(Continued)

(56) References Cited

U.S. PATENT DOCUMENTS

| 4,344,027 A | 8/1982 | Karlicek | |
| 6,636,788 B2 * | 10/2003 | Tamagawa | B60K 6/48 701/22 |

FOREIGN PATENT DOCUMENTS

| CN | 102646138 A | 8/2012 |
| JP | 3144451 B2 | 3/2001 |

(Continued)

OTHER PUBLICATIONS

Search Report and Written Opinion issued in corresponding International Patent Application No. PCT/JP2015/086131, dated Mar. 1, 2016.

*Primary Examiner* — David Luo
(74) *Attorney, Agent, or Firm* — McDermott Will & Emery LLP

(57) ABSTRACT

A variable-speed pumped storage power generation apparatus sets a maximum change rate of a power output command constant when a slip frequency is within a normal operating range, limits the maximum change rate of the power output command by multiplying the maximum change rate by a value in a range of one to zero when the slip frequency is within a range falling below a lower limit of the normal operating range by a predetermined value or less or within a range exceeding an upper limit of the normal operating range by a predetermined value or less, and limits the maximum change rate of the power output command by multiplying the maximum change rate by zero when the slip frequency is in a range falling below the lower limit by the predetermined value or more or in a range exceeding the upper limit by the predetermined value or more.

3 Claims, 3 Drawing Sheets

(51) Int. Cl.
  *F03B 15/04* (2006.01)
  *F03B 15/06* (2006.01)
  *H02P 23/00* (2016.01)
  *H02P 23/08* (2006.01)
  *H02P 101/10* (2015.01)

(52) U.S. Cl.
  CPC .......... *H02P 23/0027* (2013.01); *H02P 23/08* (2013.01); *F03B 15/06* (2013.01); *H02P 2101/10* (2015.01); *Y02E 10/226* (2013.01)

(58) Field of Classification Search
  USPC ........................................ 318/807, 767, 727
  See application file for complete search history.

(56) References Cited

FOREIGN PATENT DOCUMENTS

| | | |
|---|---|---|
| JP | 2012-016242 | 1/2012 |
| JP | 2012-016242 A | 1/2012 |
| JP | 2013-078196 A | 4/2013 |

\* cited by examiner

VARIABLE-SPEED PUMPED STORAGE POWER GENERATION APPARATUS

CROSS REFERENCE

This application is the U.S. National Phase under 35 U.S.C. § 371 of International Application No. PCT/JP2015/086131, filed on Dec. 24, 2015, the entire contents of which is hereby incorporated by reference.

FIELD

The present invention relates to a variable-speed pumped storage power generation apparatus, and more particularly to a variable-speed pumped storage power generation apparatus that performs speed control by a pump turbine in a power generation mode to be able to continue stable operation without deviating from a predetermined variable speed range and with output power monotonously following a power output command.

BACKGROUND

A variable-speed pumped storage power generation apparatus in a power generation mode adopts a method in which a pump turbine is in charge of controlling rotational speed in accordance with the power and the head and a generator motor is in charge of power control that causes the power to directly follow a power output command from the outside. Such a method can obtain a quick power response close to the power output command, but the speed control depends on the flow control on the side of the pump turbine with a slow response; therefore, speed fluctuations and overshoot are inevitable. Accordingly, a conventional variable-speed pumped storage power generation apparatus adopts protection control such as a method of preventing the slip frequency from exceeding the limit of the variable speed range by adding a power output correction command, which is defined in accordance with the rotational speed or slip frequency, to the power output command when the slip frequency approaches the limit of the variable speed range.

Patent Literature 1 below describes the method of preventing the slip frequency from exceeding the limit of the variable speed range by adding the power output correction command.

FIG. 3 is a diagram illustrating a configuration of a variable-speed pumped storage power generation apparatus described in Patent Literature 1. FIG. 3 illustrates a generator motor 1. The generator motor 1 is rotationally driven by a pump turbine 2 directly connected to a rotor and at the same time performs a variable speed operation such that a secondary winding 1b of the generator motor 1 is supplied with an AC excitation current adjusted to a predetermined frequency in accordance with rotational speed N of the generator motor 1 from a secondary excitation controller 3 equipped with a frequency converter and AC power at the same frequency as the frequency of an AC system 4 is output from a primary winding 1a of the generator motor 1.

FIG. 3 further illustrates a turbine characteristic function generator 5. The turbine characteristic function generator 5 receives a power output command Po and a water level detection signal H from the outside, and generates an optimum rotational speed command Na and an optimum guide vane opening Ya to perform operation with the maximum efficiency. FIG. 3 further illustrates a rotational speed controller 16. The rotational speed controller 16 compares the optimum rotational speed command Na with the actual rotational speed N detected by a rotational speed detector 6 and outputs a guide vane opening correction signal ΔY. The optimum guide vane opening Ya from the turbine characteristic function generator 5 is input to an adder 21 together with the guide vane opening correction signal ΔY to be input to a guide vane driving unit 10, whereby the guide vane driving unit 10 controls a guide vane 11.

FIG. 3 further illustrates a slip phase detector 7. The slip phase detector 7 detects a slip phase Sp that is equal to the difference between the potential phase of the AC system 4 and the secondary rotational phase of the generator motor 1 expressed in electrical degrees. The slip phase Sp is input to the secondary excitation controller 3. In addition, the rotational speed N detected by the rotational speed detector 6 is input to a power output command correction unit 25A.

The power output command correction unit 25A maintains an output signal thereof at zero when the rotational speed N is between set values Nklg and Nkug, reduces the output signal in proportion to the decrease in the rotational speed N when the rotational speed N falls below the set value Nklg, and increases the output signal in proportion to the increase in the rotational speed N when the rotational speed N exceeds the set value Nkug. This operation is referred to as speed protection control. The output signal of the power output command correction unit 25A is input to a transient characteristic adjuster 25B, which adjusts responsiveness and stability of the speed protection control system performed via the secondary excitation controller 3. FIG. 3 illustrates a first order lag element as an example of the transient characteristic adjuster 25B. Note that a reference character S denotes a Laplace operator. FIG. 3 further illustrates an adder 26 that adds an output ΔP1 of the transient characteristic adjuster 25B and the power output command Po provided from the outside together to produce a generator motor output command Pg.

The generator motor output command Pg and the slip phase Sp of the slip phase detector 7 are input to the secondary excitation controller 3. The secondary excitation controller 3 controls an AC excitation current supplied to the secondary winding 1b of the generator motor 1 such that a detected output signal P of the generator motor 1 detected by an active power detector 9 is equal to the generator motor output command Pg.

The variable-speed pumped storage power generation apparatus described in Patent Literature 1 with such a configuration can greatly reduce a transient overshoot of the rotational speed in an opposite direction with respect to a sudden increase or decrease in the power output command Po.

CITATION LIST

Patent Literature

Patent Literature 1: Japanese Patent No. 3144451

SUMMARY

Technical Problem

However, the output signal of the power output command correction unit is opposite in direction to the increase or decrease in the power output command Po, so that the output of the power output command correction unit suddenly changes in the direction opposite to that of the change in the power output command Po and this can possibly cause a disturbance to the side of a power system in many cases during the speed protection control, particularly at the time of operation with a low head and a plurality of apparatuses.

Moreover, PID control is typically applied to a control circuit in the rotational speed controller that compares the deviation between the rotational speed N and the optimum rotational speed command Na accompanying the change in the power output command Po and outputs the guide vane opening correction signal ΔY. When an increase or decrease in the power output command Po continues in an integral control element of an I element, commands to reduce or increase the speed deviation are accumulated to cause the guide vane opening correction signal ΔY to be output continuously even after the change in the power output command Po decreases or becomes zero. As a result, the guide vane opening Y is controlled too little or too much with respect to the optimum guide vane opening Ya to cause an overshoot of the rotational speed N; therefore, the slip frequency possibly approaches the limit of the variable speed range. In this case as well, the speed protection control possibly comes into action to cause a sudden change in the power output.

The present invention has been made in view of the above, and an object of the invention is to obtain a variable-speed pumped storage power generation apparatus that can prevent a disturbance to the side of a power system.

Solution to Problem

In order to solve the above problems and achieve the object, an aspect of the present invention is a variable-speed pumped storage power generation apparatus comprising a variable speed generator motor that has a primary side synchronously connected to a commercial power system though a frequency converter is included and a rotor rotates at a variable speed, and a pump turbine that is directly connected to the rotor of the variable speed generator motor to drive the rotor in a power generation mode and be driven by the rotor in a pumping mode, the variable-speed pumped storage power generation apparatus performing, in the power generation mode, speed control by giving, to the pump turbine that is a motor, a speed control command that is calculated by a rotational speed controller that includes a proportional control element, an integral control element, and a differential control element, on a basis of a deviation between rotational speed of the rotor and a rotational speed command of the rotor, and power control by giving a power output command to the variable speed generator motor. The variable-speed pumped storage power generation apparatus performs control in the power generation mode to set a maximum change rate of the power output command constant when a slip frequency that is a difference between a commercial power system frequency and a frequency corresponding to the rotational speed of the rotor is within a normal operating range, limit the maximum change rate of the power output command by multiplying the maximum change rate by a value in a range of one to zero in accordance with an amount of deviation of the slip frequency from the normal operating range when the slip frequency is within a range that falls below a lower limit of the normal operating range by a predetermined value or less or within a range that exceeds an upper limit of the normal operating range by a predetermined value or less, and limit the maximum change rate of the power output command by multiplying the maximum change rate by zero when the slip frequency is in a range that falls below the lower limit by the predetermined value or more or in a range that exceeds the upper limit by the predetermined value or more.

Advantageous Effects of Invention

The variable-speed pumped storage power generation apparatus according to the present invention has an effect where the power output can be prevented from disturbing the side of the power system.

DESCRIPTION OF EMBODIMENTS

Hereinafter, an embodiment of a variable-speed pumped storage power generation apparatus according to the present invention will be described in detail with reference to the drawings. Note that the present invention is not limited to the embodiment.

First Embodiment

Figure 1:
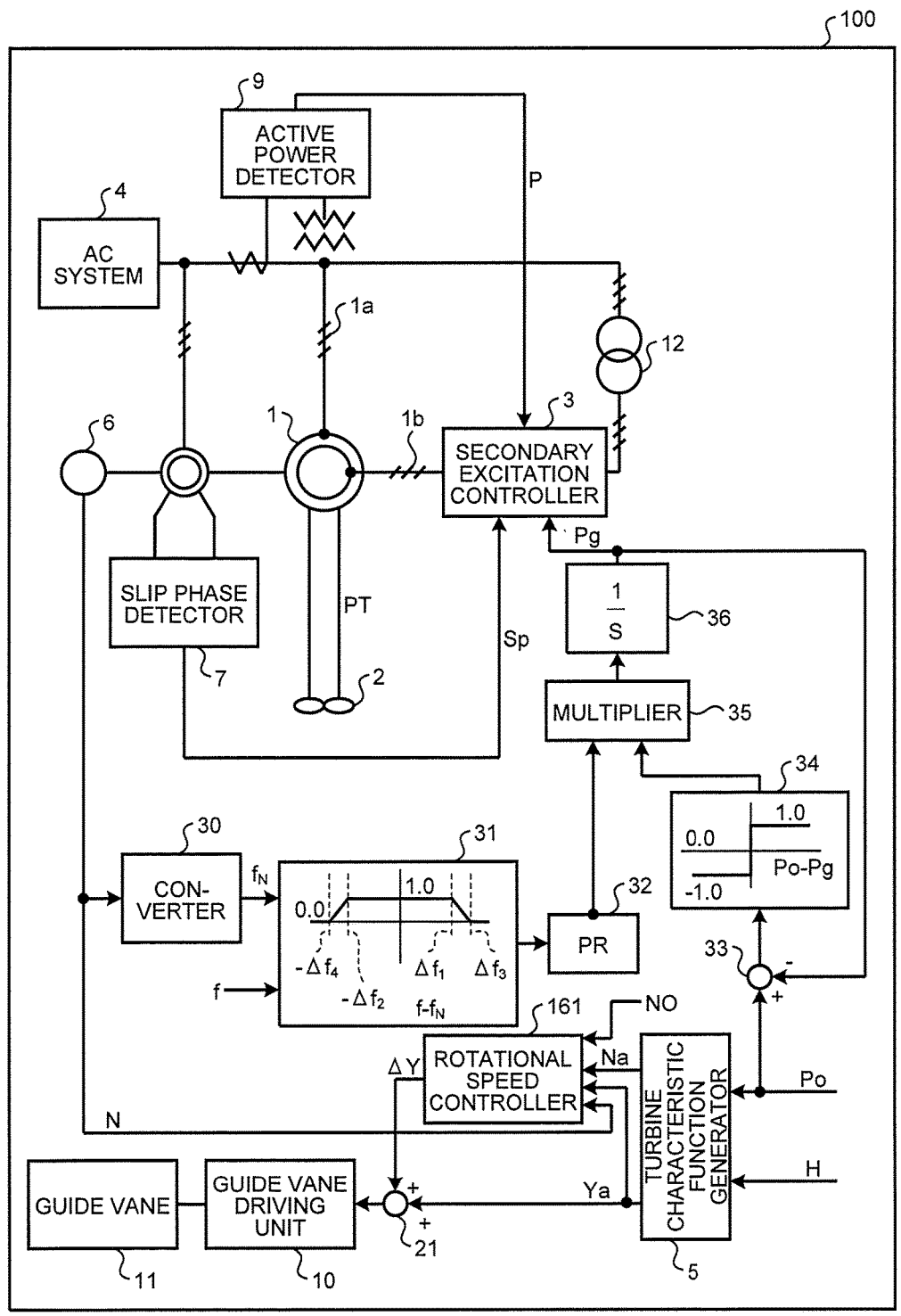
FIG. 1 is a diagram illustrating an exemplary configuration of a variable-speed pumped storage power generation apparatus according to the present invention.

FIG. 1 is a diagram illustrating an exemplary configuration of a variable-speed pumped storage power generation apparatus according to the present invention. In FIG. 1, reference numerals identical to those in FIG. 3 used to describe the conventional example indicate parts identical or equivalent to those in FIG. 3. A description of the parts denoted by the same reference numerals as those in FIG. 3 will be omitted.

Figure 3:
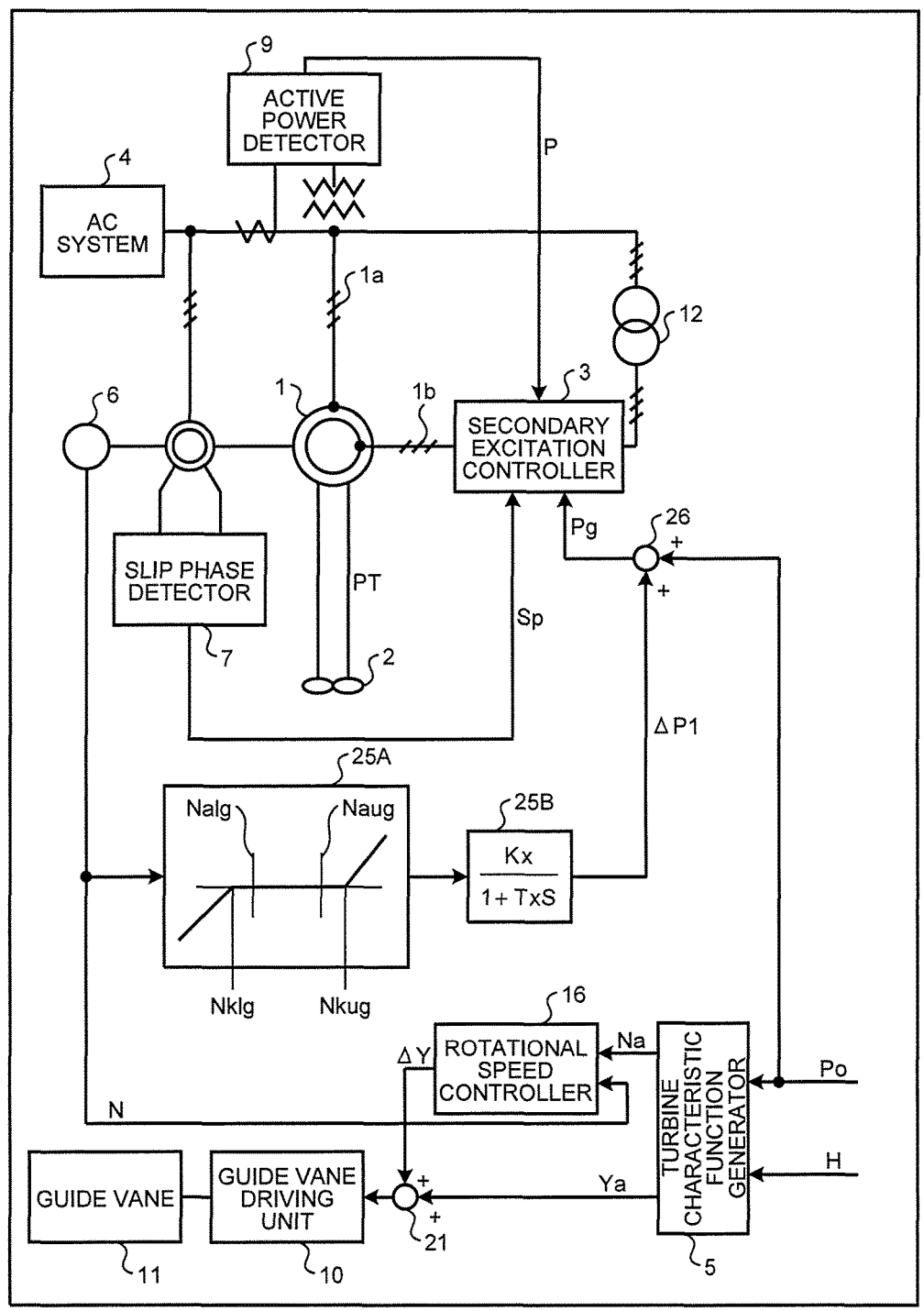
FIG. 3 is a diagram illustrating a configuration of a conventional variable-speed pumped storage power generation apparatus.

A variable-speed pumped storage power generation apparatus 100 illustrated in FIG. 1 is configured by replacing the rotational speed controller 16 of the variable-speed pumped storage power generation apparatus illustrated in FIG. 3 with a rotational speed controller 161, and further by replacing the power output command correction unit 25A, the transient characteristic adjuster 25B, and the adder 26 for generating the generator motor output command Pg with a converter 30, a power output command change rate limiter 31, a multiplier 32, a subtractor 33, a sign determiner 34, a multiplier 35, and an integrator 36.

In the variable-speed pumped storage power generation apparatus 100, an output $f_N$ of the converter 30 and a frequency f of the AC system 4 are input to the power output command change rate limiter 31, the converter 30 calculating the output $f_N$ corresponding to the synchronous frequency of the generator motor 1, which is a variable speed generator motor, from the actual rotational speed N detected by the rotational speed detector 6. The power output command change rate limiter 31 does not set a limit on the change rate of a power output command and outputs 1.0 (a constant value) as an output signal, when a difference $f-f_N$ between $f_N$ corresponding to the synchronous frequency of the generator motor 1 and the frequency f of the AC system 4 is in a normal operating range that is a range between an upper limit ($\Delta f_1$) and a lower limit ($-\Delta f_2$) being set. When the difference $f-f_N$ is in a range between the upper limit $\Delta f_1$ and $\Delta f_3$ or in a range between the lower limit $-\Delta f_2$ and $-\Delta f_4$, the power output command change rate limiter 31 outputs a value between 1.0 and 0.0 proportional to an increase or decrease in the difference f-f$_N$ as the output signal. Moreover, the power output command change rate limiter 31 outputs 0.0 (a constant value) as the output signal when the difference f-f$_N$ exceeds Δf$_3$ or when the difference f-f$_N$ falls below -Δf$_4$. Here, the values of Δf$_1$, Δf$_3$, -Δf$_2$, and -Δ$_4$ are set to satisfy Δf$_1$<Δf$_3$ and -Δf$_4$<-Δf$_2$ within a limit occurrence frequency range of the secondary excitation controller 3 so that the rotational speed N does not exceed the limit of the variable speed range of the variable-speed pumped storage power generation apparatus 100.

The multiplier 32 multiplies the output of the power output command change rate limiter 31 by a maximum change rate PR of the power output command and outputs a power output command change rate.

The subtractor 33 subtracts the generator motor output command Pg from the power output command Po externally provided, thereby outputting a required change amount Po-Pg of the generator motor output command.

The sign determiner 34 receives the required change amount Po-Pg of the generator motor output command, which is the output of the subtractor 33, and outputs 1.0 or -1.0 depending on whether the sign of Po-Pg is positive or negative. Note that the sign determiner 34 may provide a dead zone for outputting 0.0 with respect to the value of Po-Pg that is a predetermined positive or negative value or smaller near zero.

The multiplier 35 multiplies the power output command change rate, which is the output of the multiplier 32, by a determined positive/negative sign determination value for the required change amount of the generator motor output command, which is the output of the sign determiner 34, to generate a power output command increase/decrease change rate and outputs the generated power output command increase/decrease change rate.

The integrator 36 integrates the power output command increase/decrease change rate, which is the output of the multiplier 35, to generate the generator motor output command Pg and outputs the generated generator motor output command Pg.

Figure 2:
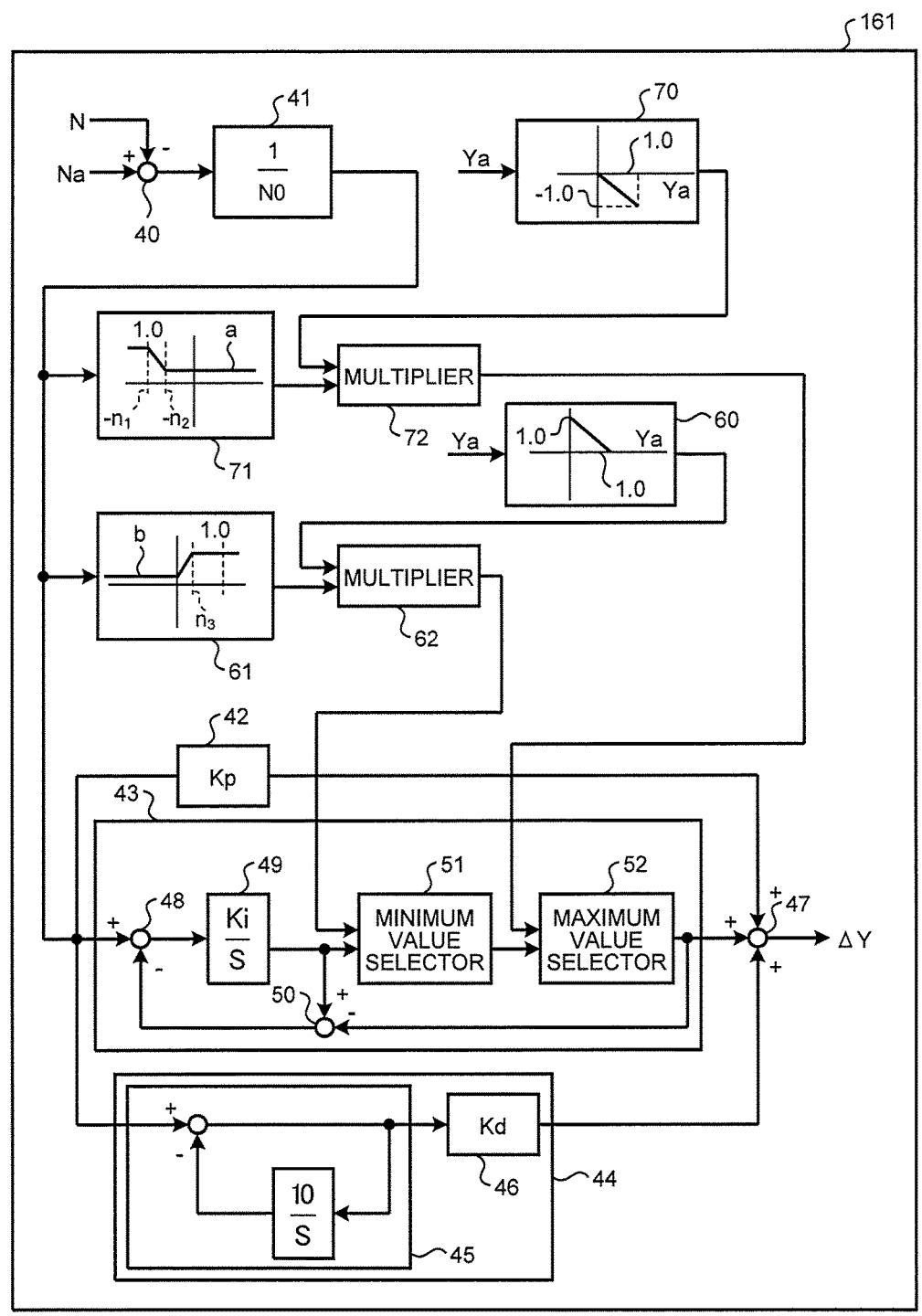
FIG. 2 is a diagram illustrating an exemplary configuration of a rotational speed controller.

FIG. 2 is a diagram illustrating an exemplary configuration of the rotational speed controller 161.

The rotational speed controller 161 includes a subtractor 40, multipliers 41 and 42, an integral control element 43, a differential control element 44, an adder 47, upper limit limiting functions 60 and 61, a multiplier 62, lower limit limiting functions 70 and 71, and a multiplier 72. The integral control element 43 includes a subtractor 48, an integral control function 49, a minimum value selection function 51, and a maximum value selection function 52. The differential control element 44 includes an imperfect differential function 45 and a multiplier 46.

The subtractor 40 receives the optimum rotational speed command Na output from the turbine characteristic function generator 5 and the actual rotational speed N of the rotor of the generator motor detected by the rotational speed detector 6, subtracts the rotational speed N from the optimum rotational speed command Na, and outputs the rotational speed deviation Na-N of the rotor of the generator motor.

The multiplier 41 multiplies the rotational speed deviation Na-N of the rotor of the generator motor, which is the output of the subtractor 40, by a reciprocal of a synchronous rotational speed N0 of the rotor of the generator motor with respect to the rated frequency of the AC system 4, thereby outputting a dimensionless rotational speed deviation (Na-N)/N0 of the rotor of the generator motor.

The multiplier 42 is a proportional control function of a proportional control element of the rotational speed controller 161, and outputs a signal obtained by multiplying the dimensionless rotational speed deviation (Na-N)/N0 of the rotor of the generator motor by a proportional gain Kp. In the integral control element 43, which is an integral control element of the rotational speed controller 161, the subtractor 48 subtracts an output value of a subtractor 50 from the dimensionless rotational speed deviation (Na-N)/N0 of the rotor of the generator motor, and the integral control function 49 performs integration by multiplying the output value of the subtractor 48 by an integral gain Ki. Moreover, the minimum value selection function 51 compares the output value of the integral control function 49 with the output value of the multiplier 62, and outputs the minimum of the output values as a limit of the upper limit of an integral-control-element output runaway preventing circuit. The maximum value selection function 52 compares the output value of the minimum value selection function 51 with the output value of the multiplier 72, and outputs the maximum of the output values as a limit of the lower limit of the integral-control-element output runaway preventing circuit. The differential control element 44 is a differential control element of the rotational speed controller 161, and outputs a value obtained by multiplying the output value of the imperfect differential function 45, to which the dimensionless rotational speed deviation (Na-N)/N0 of the rotor of the generator motor is input, by a differential gain Kd in the multiplier 46. The adder 47 adds the output value of the multiplier 42, the output value of the integral control element 43, and the output value of the differential control element 44 together, thereby outputting the result of the addition as the guide vane opening correction signal ΔY that is the output of the rotational speed controller 161.

Note that the subtractor 50 in the integral control element 43 subtracts the output value of the maximum value selection function 52 from the output value of the integral control function 49 and outputs the result of the subtraction to the subtractor 48.

Next, the upper limit limiting function and the lower limit limiting function of the integral-control-element output runaway preventing circuit of the integral control element according to the present invention will be described.

The upper limit limiting function 60 is an example of an upper limit limiting function determined in accordance with the optimum guide vane opening Ya of a conventional integral-control-element output runaway preventing circuit, and outputs a value from 1.0 to 0.0 with respect to the input value 0.0 to 1.0 of the optimum guide vane opening Ya.

The upper limit limiting function 61 is an example of an upper limit limiting function determined in accordance with the dimensionless rotational speed deviation (Na-N)/N0 that is the output of the multiplier 41.

In order to limit the output value of the positive guide vane opening correction signal ΔY due to the output of the accumulation in the integral control element of the rotational speed controller 161 in a state where the rotational speed N exceeds the optimum rotational speed command Na, the upper limit limiting function 61 outputs a value "b" when the dimensionless rotational speed deviation (Na-N)/N0 is smaller than or equal to 0.0, proportionally outputs a value from "b" to 1.0 when the dimensionless rotational speed deviation (Na-N)/N0 is in the range from 0.0 to n$_3$, and outputs 1.0 when the dimensionless rotational speed deviation (Na-N)/N0 is n$_3$ or larger. Here, the value "b" output when the dimensionless rotational speed deviation (Na-N)/N0 is 0 or smaller is selected within a range of 0.01 to 0.5.

The multiplier 62 multiplies the output value from the upper limit limiting function 60, which is determined in accordance with the optimum guide vane opening Ya of the integral-control-element output runaway preventing circuit, by the output value from the upper limit limiting function 61 for the dimensionless rotational speed deviation (Na−N)/N0, and outputs the result of the multiplication.

The lower limit limiting function 70 is an example of a lower limit limiting function determined in accordance with the optimum guide vane opening Ya of the conventional integral-control-element output runaway preventing circuit, and outputs a value from 0.0 to −1.0 with respect to the input value 0.0 to 1.0 of the optimum guide vane opening Ya.

The lower limit limiting function 71 is an example of a lower limit limiting function determined in accordance with the dimensionless rotational speed deviation (Na−N)/N0 that is the output of the multiplier 41. In order to limit the output value of the negative guide vane opening correction signal ΔY due to the output of the accumulation in the integral control element 43 of the rotational speed controller 161 within a range in which the rotational speed N falls below the optimum rotational speed command Na or within a certain range close to zero in a state in which the rotational speed N exceeds the optimum rotational speed command Na, the lower limit limiting function 71 outputs a value "a" when the dimensionless rotational speed deviation (Na−N)/N0 is larger than or equal to $-n_2$, proportionally outputs a value from "a" to 1.0 when the dimensionless rotational speed deviation (Na−N)/N0 is in the range from $-n_2$ to $-n_1$, and outputs 1.0 when the dimensionless rotational speed deviation (Na−N)/N0 is $-n_1$ or smaller. Here, the value "a" output when the dimensionless rotational speed deviation (Na−N)/N0 is larger than or equal to $-n_2$ is selected within the range of 0.01 to 0.5. Note that the range of the optimum rotational speed command for the variable speed pump turbine in the power generation mode is often limited to a lower side of the variable speed range; therefore, the dimensionless rotational speed deviations $-n_1$ and $-n_2$ are selected within the range of $(Na-N0)/N0 < -n_1 < -n_2 < 0.0$.

The multiplier 72 multiplies the output value from the lower limit limiting function 70, which is determined in accordance with the optimum guide vane opening Ya of the integral-control-element output runaway preventing circuit, by the output value from the lower limit limiting function 71 for the dimensionless rotational speed deviation (Na−N)/N0, and outputs the result of the multiplication.

As described above, the variable-speed pumped storage power generation apparatus 100 according to the present embodiment includes the power output command change rate limiter 31 that sets the maximum change rate of the power output command to the constant value of 1.0 when the slip frequency is within the normal operating range, sets the maximum change rate of the power output command to the constant value of 0 when the slip frequency falls below the lower limit of the normal operating range by a predetermined value or more or when the slip frequency exceeds the upper limit of the normal operating range by a predetermined value or more, and sets a limit by multiplying the maximum change rate of the power output command by the value in the range from 1 to 0 in accordance with the amount of deviation of the slip frequency from the normal operating range when the slip frequency is in the vicinity of the normal operating range, that is, when the amount of deviation of the slip frequency from the lower limit of the normal operating range is within a predetermined value or when the amount of deviation of the slip frequency from the upper limit of the normal operating range is within a predetermined value. As a result, a sudden change in the power output can be prevented. That is, the variable-speed pumped storage power generation apparatus that can prevent a disturbance to the side of the power system can be implemented.

REFERENCE SIGNS LIST

1 generator motor, 2 pump turbine, 3 secondary excitation controller, 4 AC system, 5 turbine characteristic function generator, 6 rotational speed detector, 7 slip phase detector, 9 active power detector, guide vane driving unit, 11 guide vane, 12 receiving transformer, 16 rotational speed controller, 21, 26, 47 adder, 30 converter, 31 power output command change rate limiter, 32, 35, 41, 42, 46, 62, 72 multiplier, 33, 40, 48, subtractor, 34 sign determiner, 36 integrator, 43 integral control element, 44 differential control element, 45 imperfect differential function, 49 integral control function, 51 minimum value selection function, 52 maximum value selection function, 60, 61 upper limit limiting function, 70, 71 lower limit limiting function.

The invention claimed is:

1. A variable-speed pumped storage power generation apparatus comprising a variable speed generator motor that has a primary side synchronously connected to a commercial power system though a frequency converter is included and a rotor rotates at a variable speed, and a pump turbine that is directly connected to the rotor of the variable speed generator motor to drive the rotor in a power generation mode and be driven by the rotor in a pumping mode, the variable-speed pumped storage power generation apparatus performing, in the power generation mode, speed control by giving, to the pump turbine that is a motor, a speed control command that is calculated by a rotational speed controller that includes a proportional control element, an integral control element, and a differential control element, on a basis of a deviation between rotational speed of the rotor and a rotational speed command of the rotor, and power control by giving a power output command to the generator motor, wherein the variable-speed pumped storage power generation apparatus performs control in the power generation mode to set a maximum change rate of the power output command constant when a slip frequency that is a difference between a commercial power system frequency and a frequency corresponding to the rotational speed of the rotor is within a normal operating range, limit the maximum change rate of the power output command by multiplying the maximum change rate by a value in a range of one to zero in accordance with an amount of deviation of the slip frequency from the normal operating range when the slip frequency is within a range that falls below a lower limit of the normal operating range by a predetermined value or less or within a range that exceeds an upper limit of the normal operating range by a predetermined value or less, and limit the maximum change rate of the power output command by multiplying the maximum change rate by zero when the slip frequency is in a range that falls below the lower limit by the predetermined value or more or in a range that exceeds the upper limit by the predetermined value or more.

2. The variable-speed pumped storage power generation apparatus according to claim 1, wherein each of an upper limit limiting function and a lower limit limiting function determined in accordance with an optimum guide vane opening of an integral-control-element output runaway preventing circuit in an integral control element of the rotational speed controller is multiplied by an upper limit limiting function or a lower limit limiting function that varies within a range of one or less to a fixed value in accordance with a deviation between an optimum rotational speed command and the rotational speed and is determined in accordance with a rotational speed deviation so as to limit output of the speed control command due to output of accumulation in an integral control function when a power output command change rate decreases suddenly.

3. The variable-speed pumped storage power generation apparatus according to claim 2, wherein the fixed value in the upper limit limiting function is selected from a range of 0.01 to 0.5 in a range in which the rotational speed exceeds the optimum rotational speed command, and the fixed value in the lower limit limiting function is selected from a range of 0.01 to 0.5 within a range in which the rotational speed falls below the optimum rotational speed command or within a fixed range close to zero in a state in which the rotational speed exceeds the optimum rotational speed command.

* * * * *